United States Patent
Gupta et al.

(10) Patent No.: US 8,775,425 B2
(45) Date of Patent: Jul. 8, 2014

(54) SYSTEMS AND METHODS FOR MASSIVE STRUCTURED DATA MANAGEMENT OVER CLOUD AWARE DISTRIBUTED FILE SYSTEM

(75) Inventors: Himanshu Gupta, New Delhi (IN); Rajeev Gupta, Noida (IN); Mukesh Kumar Mohania, Rajpur Chung (IN); Ullas Balan Nambiar, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 12/862,273

(22) Filed: Aug. 24, 2010

(65) Prior Publication Data

US 2012/0054182 A1 Mar. 1, 2012

(51) Int. Cl.
*G06F 17/30* (2006.01)

(52) U.S. Cl.
USPC ............................. 707/737; 707/602; 707/713

(58) Field of Classification Search
USPC ......... 707/737, 770, 802, 714, 602, 713, 792, 707/719, 757
See application file for complete search history.

(56) References Cited

U.S. PATENT DOCUMENTS

| | | | |
|---|---|---|---|
| 6,339,769 B1 | 1/2002 | Cochrane et al. | |
| 6,625,593 B1 | 9/2003 | Leung et al. | |
| 8,301,633 B2 * | 10/2012 | Cheslow | 707/739 |
| 8,468,120 B2 * | 6/2013 | Gupta et al. | 707/602 |
| 8,527,549 B2 * | 9/2013 | Cidon | 707/802 |
| 8,656,453 B2 * | 2/2014 | Punnoose et al. | 726/1 |
| 2004/0260684 A1 * | 12/2004 | Agrawal et al. | 707/3 |
| 2005/0251511 A1 | 11/2005 | Shankar et al. | |
| 2006/0218123 A1 | 9/2006 | Chowdhuri et al. | |
| 2007/0168336 A1 * | 7/2007 | Ransil et al. | 707/3 |
| 2008/0228743 A1 * | 9/2008 | Kusnitz et al. | 707/4 |
| 2008/0306990 A1 * | 12/2008 | Grosman et al. | 707/102 |
| 2009/0055370 A1 * | 2/2009 | Dagum et al. | 707/4 |
| 2010/0241629 A1 * | 9/2010 | Tatemura et al. | 707/741 |
| 2010/0281017 A1 * | 11/2010 | Hu et al. | 707/718 |
| 2011/0252071 A1 * | 10/2011 | Cidon | 707/802 |
| 2012/0054146 A1 * | 3/2012 | Gupta et al. | 707/602 |
| 2013/0290295 A1 * | 10/2013 | Soules et al. | 707/714 |

OTHER PUBLICATIONS

Query Execution in Column-Oriented Database Systems, daniel J. Abadi, Feb. 2008.*
Hasan, Waqar, and Motwani, Rajeev, "Coloring Away Communication in Parallel Query Optimization", Proceedings of the 21st VLDB Conference, Zurich, Switzerland, 1995.
Alom, B.M. Monjurul: Henskens, Frans: and Hannaford, Michael, "Query Processing and Optimization in Distributed Database Systems", IJCSNS International Journal of Computer Science and Network Security, vol. 9., No. 9., Sep. 2009.
Herodotou, Herodotos: Borisov, Medyalko: and Babu, Shivnath, "Join Optimization Techniques for Partitioned Tables", VLDB '10, Sep. 13-17, 2010, Singapore, available at http://www.cs.duke.edu/~shivnath/tmp/paqo_draft.pdf.

* cited by examiner

*Primary Examiner* — Jean M Corrielus
(74) *Attorney, Agent, or Firm* — Ference & Associates LLC

(57) ABSTRACT

Methods and arrangements for accommodating a query, directing the query to datasets, creating partitions and partitioning the datasets, and returning a response to the query, the response being structured in accordance with the created partitions.

16 Claims, 5 Drawing Sheets

SYSTEMS AND METHODS FOR MASSIVE STRUCTURED DATA MANAGEMENT OVER CLOUD AWARE DISTRIBUTED FILE SYSTEM

BACKGROUND

Cloud computing, as is well known, is Internet-based computing in which shared resources, software, and information are provided to computers and other devices on demand, as happens analogously with an electricity grid. Applications, that is, different programs that can be downloaded to computers and mobile devices, increasingly are becoming widely available on the cloud, as are larger amounts of information and data that can be widely shared. For instance, Amazon.com Inc. of Seattle, Wash. hosts scientific data for free.

One problem that is increasingly being encountered is that with an increase in structured data volumes in telecom, retail, finance and government domains, there is lacking a low-cost, easy to deploy data management arrangement that provides seamless connectivity to existing enterprise data management solutions.

Generally, conventional data management solutions cannot scale. By way of example, adequate solutions are not found for scaling to store and process increasingly large numbers of call data records (CDRs), nor for collecting and managing increasingly large numbers of data points from several sources maintained by both public and private sector organizations

BRIEF SUMMARY

In summary, one aspect of the invention provides a method comprising: accommodating a query; directing the query to datasets; creating partitions and partitioning the datasets; and returning a response to the query, the response being structured in accordance with the created partitions.

Another aspect of the invention provides an apparatus comprising: one or more processors; and a computer readable storage medium having computer readable program code embodied therewith and executable by the one or more processors, the computer readable program code comprising: computer readable program code configured to accommodate a query; computer readable program code configured to direct the query to datasets; computer readable program code configured to create partitions and partition the datasets; and computer readable program code configured to return a response to the query, the response being structured in accordance with the created partitions.

An additional aspect of the invention provides a computer program product comprising: a computer readable storage medium having computer readable program code embodied therewith, the computer readable program code comprising: computer readable program code configured to accommodate a query; computer readable program code configured to direct the query to datasets; computer readable program code configured to create partitions and partition the datasets; and computer readable program code configured to return a response to the query, the response being structured in accordance with the created partitions.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
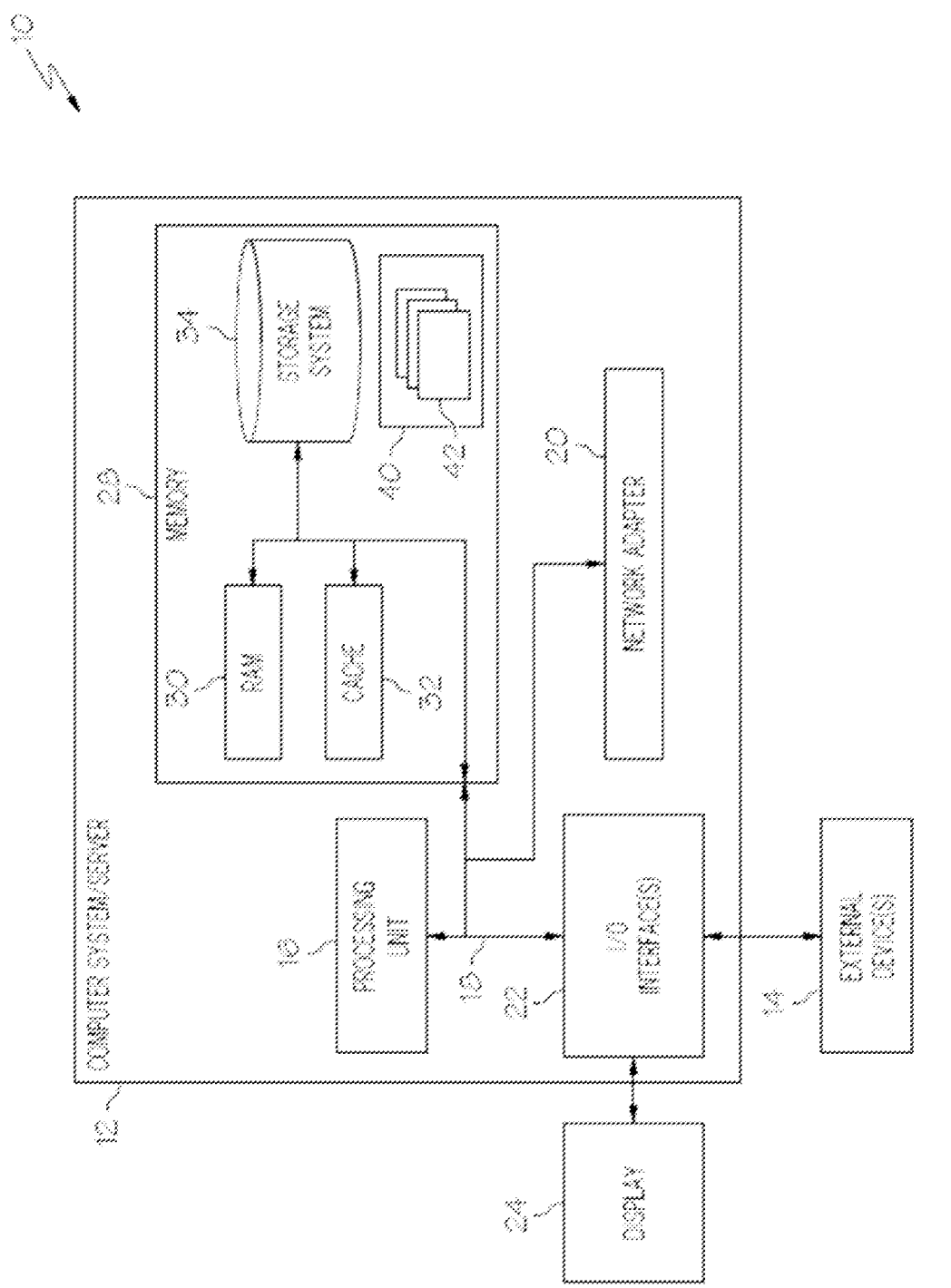
FIG. 1 depicts a cloud computing node according to an embodiment of the present invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-Demand Self-Service: a cloud consumer can unilaterally provision computing capabilities, such as server time and network storage, as needed automatically without requiring human interaction with the service's provider.

Broad Network Access: capabilities are available over a network and accessed through standard mechanisms that promote use by heterogeneous thin or thick client platforms (e.g., mobile phones, laptops, and PDAs).

Resource Pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid Elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: the cloud infrastructure is operated solely for an organization. It may be managed by the organization or a third party and may exist on-premises or off-premises.

Community Cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the cloud infrastructure is made available to the general public or a large industry group and is owned by an organization selling cloud services.

Hybrid Cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
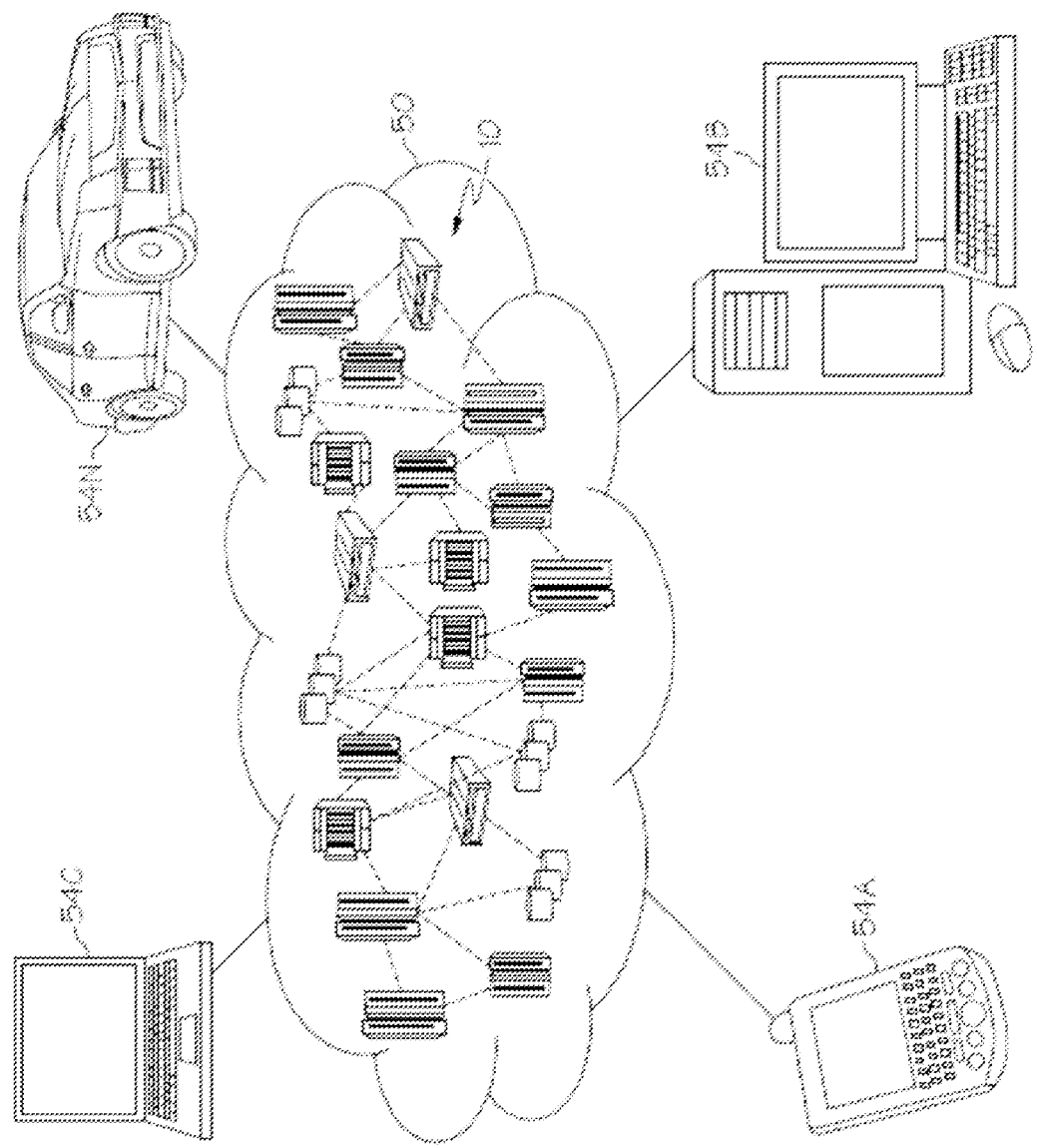
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
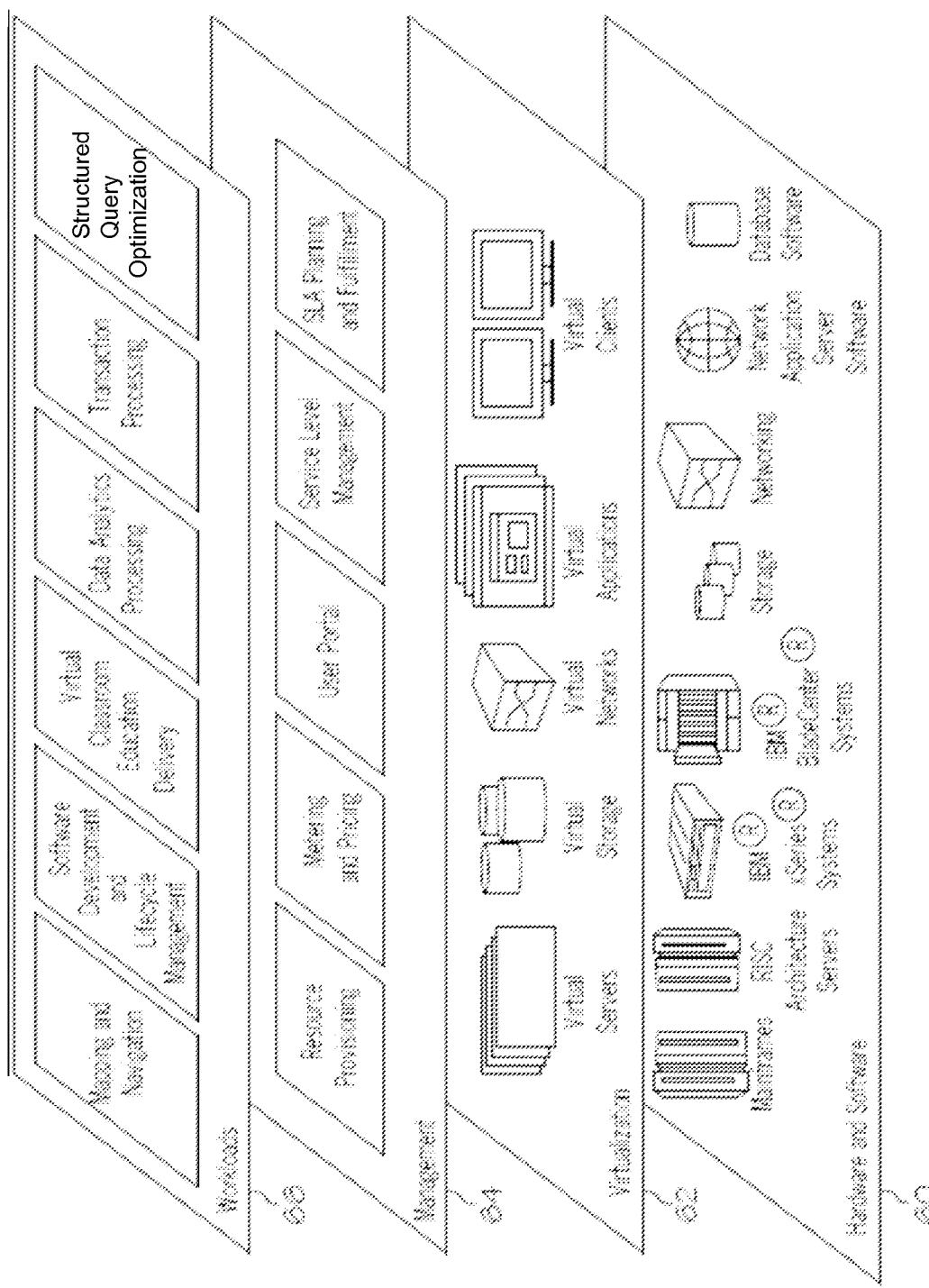
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, in accordance with at least one embodiment of the invention, optimization of structured queries.

Figure 4:
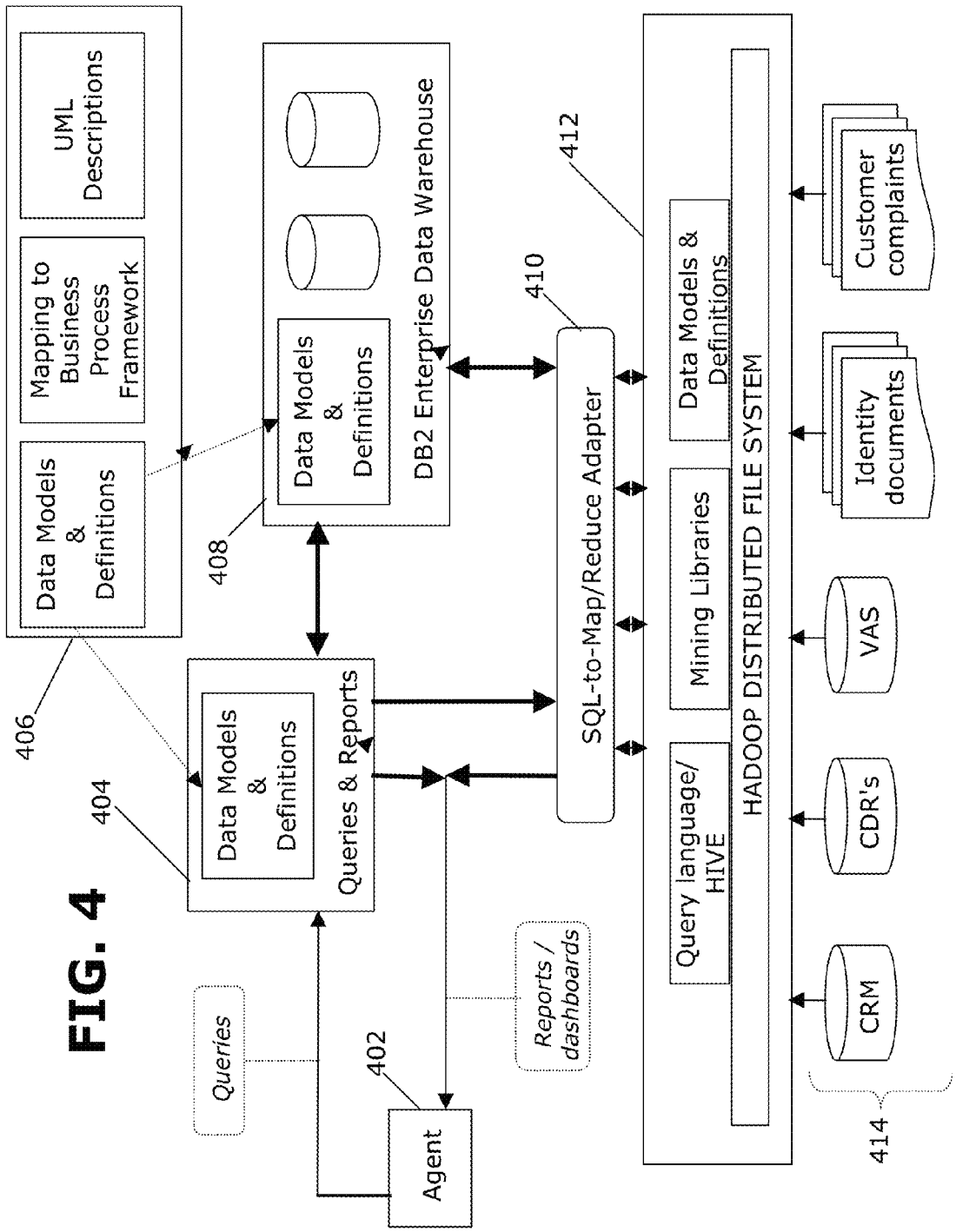
FIG. 4 schematically illustrates an arrangement for query optimization in accordance with at least one embodiment of the invention.

The disclosure now turns to FIG. 4. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1 and as carried out on layer 66 in FIG. 3. In accordance with an example embodiment, most if not all of the process steps, components and outputs discussed with respect to FIG. 4 can be performed or utilized by way of a processing unit or units and system memory such as those indicated, respectively, at 16 and 28 in FIG. 1, whether on a server computer, a client computer, a node computer in a distributed network, or any combination thereof. In accordance with embodiments of the invention, the system on which embodiments of the invention is carried out is embodied by a mobile device such as a laptop computer or a mobile phone, such as a "smart phone" with numerous functions analogous or similar to those found on many laptop or desktop computers.

Broadly contemplated herein, in accordance with at least one embodiment of the invention, is the use of a map-reduce cluster that works as live archival solution. In accordance with at least one embodiment of the invention, the map-reduce cluster is a Hadoop cluster. (Hadoop is a distributed file system, particularly, a "cloud" file system designed to run on commodity hardware, as developed by the Apache Software Foundation of Forest Hill, Md.)

In accordance with at least one embodiment of the invention, an enterprise can effectively perform analytics over very large amounts of data, while data on the Hadoop or other distributed file system can be used to build customer profiles, model churn, create marketing plans, and perform other worthwhile tasks. The time-consuming and lossy process of moving data to/from tape is avoided, and analysts become able to seamlessly query over data both from a data warehouse and from that archived or created in a distributed file system such as a Hadoop.

In accordance with at least one embodiment of the invention, data coherency is pursued via employing a "write-once-read-many" access model, where a client can only append to existing files.

In accordance with at least one embodiment of the invention, files are broken up into blocks. An intelligent client finds the location of blocks.

FIG. 4 schematically illustrates an arrangement for query optimization in accordance with at least one embodiment of the invention. An agent 402 sends a query to a query/report compiler 404. A repository 406 includes data models and definitions, a mapping to business process framework and UML (Unified Modeling Language) descriptions. Compiler 404 draws on this for data models and definitions.

Some queries are directed to a conventional DB2 enterprise data warehouse 408, which itself draws on repository 406 for data models and definitions. Other queries are directed to a SQL-to-map/reduce adapter 410. Replies to queries from warehouse 408 and adapter 410 are returned to agent 402 in the form of reports; reports from adapter 410 need not necessarily be run through compiler 404.

This adapter 410 is in communication with a Hadoop distributed file system 412. (A Hadoop distributed file system is presented here merely as an illustrative and non-restrictive example. Essentially any suitable distributed file system may be employed.) The Hadoop , itself accessible via a query language designed for Javascript Object Notation (JSON) and employing Hive, which as known is a database/data warehouse on top of Hadoop. Hive, in accordance with at least one embodiment of the invention, supports the SQL-like querying of data. Also included in Hadoop 412 are data models and definitions. Such data model and definitions, in accordance with at least one embodiment of the invention, are artifacts that may be designed by subject matter experts and incorporated into a database or data warehouse. The data models and definitions are then copied over to the HDFS 412 when data is to be moved from the data warehouse 408 or elsewhere to the HDFS 412.

HDFS 412 is in communication with vast stores of data 414 via the cloud; such data may include, but need not necessarily be limited to: CRM (customer relation management) strategy; CDR's; VAS (value added services); identity documents; and customer complaint data.

In accordance with at least one embodiment of the invention, query optimization over the HDFS 412 takes place via a smart partitioning and replication strategy. Particularly, smart partitioning with indexing is involved.

Accordingly, in accordance with at least one embodiment of the invention, datasets (from the warehouse 408 and from the distributed file system 412) are partitioned into horizontal subsets such that tuples having high similarity fall together. Each sub-partition may be further partitioned in a locally optimal manner, and partition keys may be mapped to Hive. Query responses based on the partitions are then returned to the agent 402. By way of clarification, "partitions" can be regarded here as data divided into several similarly-sized pieces by a map-reduce system (e.g., HDFS), whereby a new map task is allocated to each piece. In accordance with at least one embodiment of the invention, in Hive, a partition is defined for an attribute whereby, all tuples having the same value for this attribute belong to the same partition. In this manner, if a query contains a search predicate for this attribute, the query can be executed efficiently.

In accordance with at least one embodiment of the invention, indexing takes place via Lucene (a free/open source information retrieval software library originally created in Java and supported by Apache). Inverted index maps can be employed to identify pairs where attributes are equivalent to predetermined values, and indicate their occurrence among the partitions.

In accordance with at least one embodiment of the invention, given a SQL query from agent 402, the query is parsed by compiler 404 and values are looked up in the Lucene index (itself associated with Hadoop or other distributed file system 412). Partitions are identified and the query is rewritten into Hive (at 412) with partition information. Partitioning can take place essentially anywhere, e.g., via a suitable separate software component.

In accordance with at least one embodiment of the invention, smart replication is undertaken via keeping replicas that are sorted over different attribute sets. Queries may then be redirected to correct replicas at query execution time. More particularly, the HDFS 412 allows one to maintain multiple copies (or replicas) of files stored in the system. However, these are exact replicas with no change in the ordering of the content. In accordance with with at least one embodiment of the invention, there is a mimicking of the default process yet instead of keeping exact copies, the process reorders the content inside files by sorting the content on the values mapped to some attribute. This can apply to files in HDFS that are storing structured data that originated in some relational database or data warehouse. A "smart replica" refers to the set of the same records that likely are reordered. The reordering can be done based on sorting, e.g., on one or more attributes, information gain based heuristics algorithms, or clustering, or can involve further exhaustive algorithms.

Figure 5:
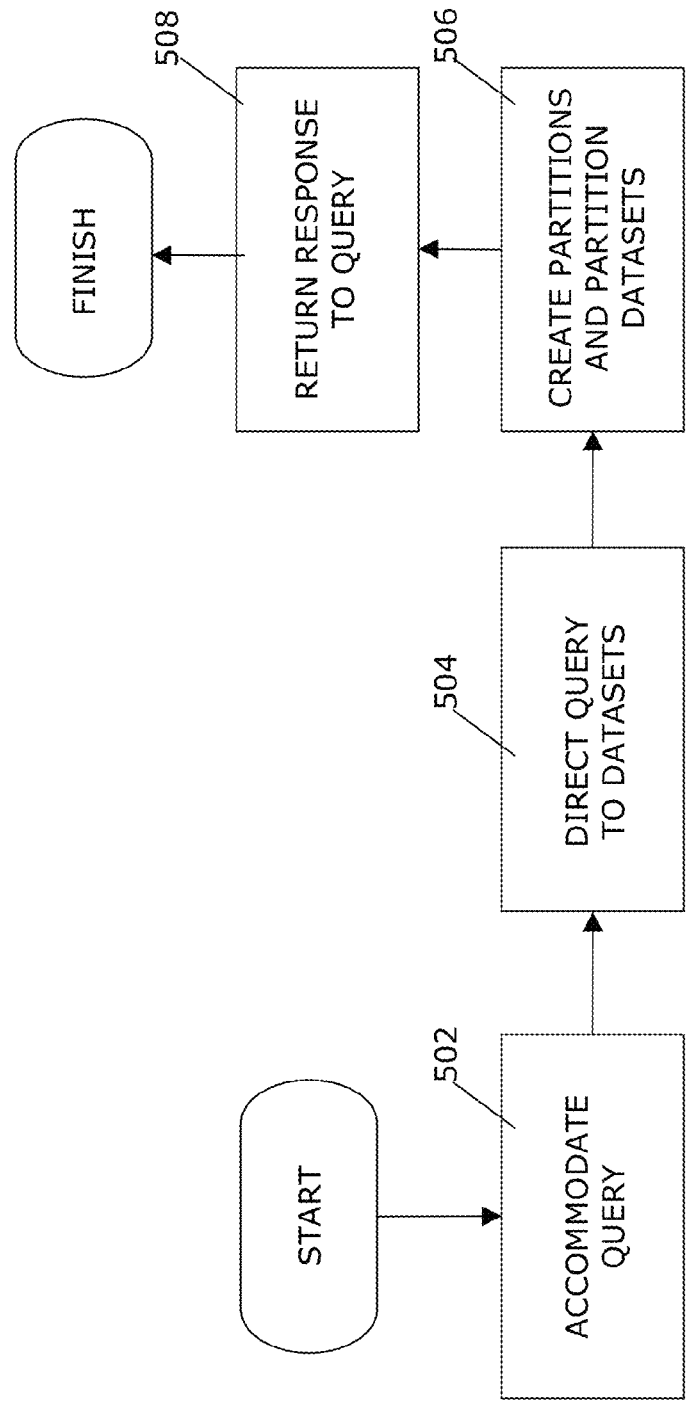
FIG. 5 sets forth a process more generally for structured query optimization in accordance with at least one embodiment of the invention.

FIG. 5 sets forth a process more generally for structured query optimization in accordance with at least one embodiment of the invention. It should be appreciated that a process such as that broadly illustrated in FIG. 5 can be carried out on essentially any suitable computer system or set of computer systems, which may, by way of an illustrative and on-restrictive example, include a system such as that indicated at 12 in FIG. 1 and as carried out on layer 66 in FIG. 3. In accordance with an example embodiment, most if not all of the process steps discussed with respect to FIG. 5 can be performed by way a processing unit or units and system memory such as those indicated, respectively, at 16 and 28 in FIG. 1.

As shown in FIG. 5, a query is accommodated (502) and the query is directed to datasets (504). Partitions are created and the datasets partitioned (506), and a response to the query is returned (508), the response being structured in accordance with the created partitions.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   accommodating a query;
   directing the query to datasets which include data from files in a distributed file system;
   creating partitions of the datasets, wherein said creating comprises creating smart replicas, and wherein the smart replicas comprise reordered content of the datasets;
   indexing the partitions via mapping partition keys to a database atop the distributed file system;
   parsing the query;
   looking up indexed values based on the parsed query;
   identifying partitions based on said looking up of indexed values;
   rewriting the query, with partition information, into the database atop the distributed file system; and
   returning a response to the query, wherein the response is structured based on the created partitions.

2. The method according to claim 1, wherein said creating of partitions comprises creating horizontal partitions.

3. The method according to claim 2, wherein the horizontal partitions comprise tuples of high similarity.

4. The method according to claim 1, wherein the datasets include data from a data warehouse.

5. The method according to claim 1, comprising repartitioning each partition locally.

6. The method according to claim 1, wherein said indexing comprises employing inverted index maps identifying pairs where attributes are equivalent to predetermined values.

7. The method according to claim 6, wherein said employing of inverted index maps comprises indicating occurrences of attribute-value equivalencies among partitions.

8. The method according to claim 1, wherein said creating of smart replicas comprises keeping replicas sorted over different attribute sets.

9. An apparatus comprising:
   one or more processors; and
   a computer readable storage medium having computer readable program code embodied therewith and executable by the one or more processors, the computer readable program code being configured to:
   accommodate a query;
   direct the query to datasets which include data from files in a distributed file system;
   create partitions of the datasets, wherein to create partitions comprises creating smart replicas, and wherein the smart replicas comprise reordered content of the datasets;
   index the partitions via mapping partition keys to a database atop the distributed file system;
   parse the query;
   look up indexed values based on the parsed query;
   identify partitions based on the looking up of indexed values;
   rewrite the query, with partition information, into the database atop distributed file system; and
   return a response to the query, wherein the response is structured based on the created partitions.

10. A computer program product embedded in a computer readable storage medium embodied with computer readable program code which, when executed, causes a computing device to perform operations, the computer readable program code being configured to:
    accommodate a query;
    direct the query to datasets which include data from files in a distributed file system;
    create partitions of the datasets, wherein to create partitions comprises creating smart replicas, and wherein the smart replicas comprise reordered content of the datasets;
    index the partitions via mapping partition keys to a database atop the distributed file system;
    parse the query;
    look up indexed values based on the parsed query;
    identify partitions based on the looking up of indexed values;
    rewrite the query, with partition information, into the database atop distributed file system; and
    return a response to the query, wherein the response is structured based on the created partitions.

11. The computer program product according to claim 10, wherein said computer readable program code is configured to create horizontal partitions.

12. The computer program product according to claim 10, wherein the datasets include data from a data warehouse.

13. The computer program product according to claim 10, wherein said computer readable program code is configured to re-partition each partition locally.

14. The computer program product according to claim 10, wherein said computer readable program code is configured to employ inverted index maps identifying pairs where attributes are equivalent to predetermined values.

15. The computer program product according to claim 14, wherein said computer readable program code is configured to indicate occurrences of attribute-value equivalencies among partitions.

16. The computer program product according to claim 10, wherein said computer readable program code is configured to keep replicas sorted over different attribute sets.

* * * * *